United States Patent
Sasaki

(10) Patent No.: US 8,838,404 B2
(45) Date of Patent: Sep. 16, 2014

(54) PHYSICAL QUANTITY SENSOR

(75) Inventor: Tomohisa Sasaki, Tokyo (JP)

(73) Assignee: Azbil Corporation, Tokyo (JP)

(\*) Notice: Subject to any disclaimer, the term of this patent is extended or adjusted under 35 U.S.C. 154(b) by 321 days.

(21) Appl. No.: 13/159,947

(22) Filed: Jun. 14, 2011

(65) Prior Publication Data

US 2011/0313704 A1 Dec. 22, 2011

(30) Foreign Application Priority Data

Jun. 18, 2010 (JP) .................................. 2010-139376

(51) Int. Cl.
- G06F 19/00 (2011.01)
- G01L 9/02 (2006.01)
- G01F 1/50 (2006.01)
- G01F 1/36 (2006.01)

(52) U.S. Cl.
CPC . G01L 9/025 (2013.01); G01F 1/50 (2013.01); G01F 1/363 (2013.01)
USPC ........... 702/100; 73/335.04; 73/1.88; 73/708; 73/721; 324/706; 324/721; 324/725

(58) Field of Classification Search
USPC .............. 702/100; 73/335.04, 1.88, 708, 721; 324/725, 721, 706
See application file for complete search history.

(56) References Cited

U.S. PATENT DOCUMENTS

| | | | |
|---|---|---|---|
| 5,642,301 A | 6/1997 | Warrior et al. | |
| 5,960,375 A | 9/1999 | Warrior et al. | |
| 6,329,825 B1 * | 12/2001 | Tanaka et al. | 324/725 |
| 2004/0066831 A1 * | 4/2004 | Shivaswamy et al. | 374/55 |
| 2005/0160841 A1 | 7/2005 | Morikawa | |
| 2006/0265167 A1 | 11/2006 | Laraia et al. | |
| 2009/0120207 A1 | 5/2009 | Ohtani et al. | |

FOREIGN PATENT DOCUMENTS

| | | |
|---|---|---|
| CN | 1139483 A | 1/1997 |
| CN | 1720428 A | 1/2006 |
| CN | 101171496 A | 4/2008 |
| CN | 101430026 A | 5/2009 |
| JP | 62-218813 A | 9/1987 |
| JP | 6-294664 A | 10/1994 |

(Continued)

OTHER PUBLICATIONS

Japanese Office Action, dated Aug. 22, 2013, which issued during the prosecution of Japanese Patent Application No. 2010-139376.

(Continued)

*Primary Examiner* — Jonathan C Teixeira Moffat
*Assistant Examiner* — Hien Vo
(74) *Attorney, Agent, or Firm* — Troutman Sanders LLP

(57) ABSTRACT

A pressure detector detecting a pressure of cold or hot water; a temperature detector detecting a temperature of a pressure sensor; correcting equation storage storing, cold water correcting equation information applied when the temperature detected by the temperature detector is included in a cold water temperature range, and hot water correcting equation information applied when the temperature detected by the temperature detector is included in a hot water temperature range; a temperature range determiner determining the temperature range that includes the temperature detected by the temperature detector as either a cold water temperature range or a hot water temperature range; and a correction calculating portion using the correcting equation corresponding to the temperature range determined by the temperature range determiner correcting the detection signal by the pressure detector, and outputting the post-correction signal as a measurement signal.

1 Claim, 3 Drawing Sheets

(56) References Cited

FOREIGN PATENT DOCUMENTS

| | | |
|---|---|---|
| JP | 8-145715 A | 6/1996 |
| JP | 2001-153745 A | 6/2001 |
| JP | 2004-294110 A | 10/2004 |
| JP | 2009-31003 A | 2/2009 |
| JP | 2009-115302 A | 5/2009 |

OTHER PUBLICATIONS

Chinese Office Action dated Aug. 23, 2013, which issued during the prosecution of Chinese Patent Application No. 201110165725.2.

* cited by examiner

FIG. 3

| For Cold Water | | For Hot Water | |
|---|---|---|---|
| Gain Factor | XX | Gain Factor | XX |
| Offset Factor | XX | Offset Factor | XX |

PHYSICAL QUANTITY SENSOR

CROSS REFERENCE TO RELATED APPLICATIONS

The present application claims priority under 35 U.S.C, §119 to Japanese Patent Application No. 2010-139376, filed Jun. 18, 2010, which is incorporated herein by reference,

FIELD OF TECHNOLOGY

The present invention relates to a physical quantity sensor.

BACKGROUND OF THE INVENTION

Japanese Unexamined Patent Application Publication 2009-31003 ("JP '003"), below, discloses a dual pressure sensor for detecting pressures, of that which is to be measured, with each of two pressure sensors. The dual pressure sensor as set forth in JP '003 can be installed in, for example, a valve unit of a flow control valve as set forth in Japanese Unexamined Patent Application Publication 2009-115302 ("JP '302"), below. In this case, the dual pressure sensor detects both the fluid pressures on the upstream side of the valve unit and on the downstream side of the valve unit, and outputs to a flow measuring device for controlling the flow control valve. The flow measuring device calculates the flow of the fluid flowing within a flow path of the flow controlling valve based on the differential pressure between the fluid pressure on the upstream side and the fluid pressure on the downstream side.

Note that this pressure sensor has a temperature characteristic wherein the output value will fluctuate with the temperature at the time of use. In order to calculate the flow of the fluid accurately when using a pressure sensor having this type of temperature characteristic, it is necessary to perform accurate temperature correction on the output value of the pressure sensor to eliminate from the output value the fluctuation portion due to temperature variation. Japanese Unexamined Patent Application Publication 2004-294110, below, discloses a technology wherein, when correcting the sensor output value for temperature, the temperature range in a non-linear temperature characteristic curve is divided into a plurality of segments, and a temperature correction is performed using the values on the lines that connect the ends of each of the segments. Japanese Unexamined Patent Application Publication H6-294664, below, discloses a technology wherein a high-order equation that most nearly approximates the temperature characteristic curve is calculated, and temperature correction of the output value of the sensor is performed using the high-order equation.

In the temperature correction in JP '003, a correction is possible in a state wherein there is no difference between the temperature characteristic curves at both ends of the divided segments that are connected by straight lines, but if there is a large difference between the temperature characteristic curves at the intermediate positions in the divided segments, the accuracy of the temperature correction will fall. Moreover, in the temperature correction in JP '302, described above, because a single high-order correcting equation is made, is not possible to correct with excellent accuracy the entire scope of temperatures, causing the difference from the temperature characteristic curve to be large, depending on the temperature band wherein the correction is being made, resulting in a decrease in accuracy of the temperature correction.

Given this, the object of the present invention is to provide a physical quantity sensor wherein the accuracy of the temperature correction can be improved.

SUMMARY OF THE INVENTION

The physical quantity sensor according to the present invention includes a physical quantity detecting element for detecting a physical quantity of an object being measured; a temperature detecting element for detecting the temperature of the physical quantity detecting element; a correcting equation storing portion for storing, as information for a correcting equation that is used in a correcting process to eliminate the portion of the fluctuation that is due to the temperature variation, from the detection signal by the physical quantity detecting element, information for a first correcting equation that is applied when the temperature of the physical quantity detecting element is within a first temperature range, and information for a second correcting equation that is applied when the temperature of the physical quantity detecting element is within a second temperature range that does not overlap the first temperature range; a temperature range determining portion for determining either the first temperature range or the second temperature range as the temperature range that includes the detection temperature of the temperature detecting element; and a correction calculating portion for using the correcting equation that corresponds to the temperature range, determined by the temperature range determining portion, to correct the detection signal of the physical quantity detecting element, and to output the signal after correction as a measurement signal.

This structure makes it possible to perform temperature correction using a first correcting equation that corresponds to a first temperature range when the temperature of the physical quantity detecting element is included within the first temperature range, and to perform temperature correction using the second correcting equation, which corresponds to the second temperature range, when the temperature of the physical quantity detecting element is included in a second temperature range that is distinct from the first temperature range, when performing temperature correction of a detection signal of the physical quantity detecting element. This makes it possible to select two non-overlapping temperature ranges from a range of temperatures over which a pressure sensor is used, and to perform temperature corrections using correcting equations that are optimized to the respective temperature ranges.

In the physical quantity sensor set forth above, the first correcting equation and the second correcting equation may be linear correcting equations that minimize the maximum difference between the output value corresponding to the detection signal of the physical quantity detecting element and the value corresponding to the measurement signal after the correction, in the temperature range corresponding to that correcting equation.

Doing so makes it possible to use linear correcting equations that minimize the maximum difference, thus making it possible to suppress the maximum difference while reducing the amount of memory used for the strength correcting equations.

In the physical quantity sensor set forth above, the physical quantity that is the subject of the measurement set forth above may be a pressure of a fluid. Additionally, in the physical quantity sensor described above, two physical quantity detecting elements may be provided.

The present invention is able to provide a physical quantity sensor able to improve the accuracy of temperature correction.

BRIEF DESCRIPTION OF THE DRAWINGS

FIG. 3 is a diagram illustrating a table for storing coefficients for a correcting equation.

DETAILED DESCRIPTION OF THE PRESENT INVENTION

An example according to the present invention will be explained below. In the descriptions of the drawings below, identical or similar components are indicated by identical or similar codes. Note that the diagrams are schematic. Consequently, specific measurements should be evaluated in light of the descriptions below. Furthermore, even within these drawings there may be portions having differing dimensional relationships and proportions.

A pressure sensor that is the physical quantity sensor is explained in the present form of embodiment. Note that the physical quantity sensor is not limited to a pressure sensor, but rather can be applied similarly to sensors for detecting other physical quantities.

Figure 1:
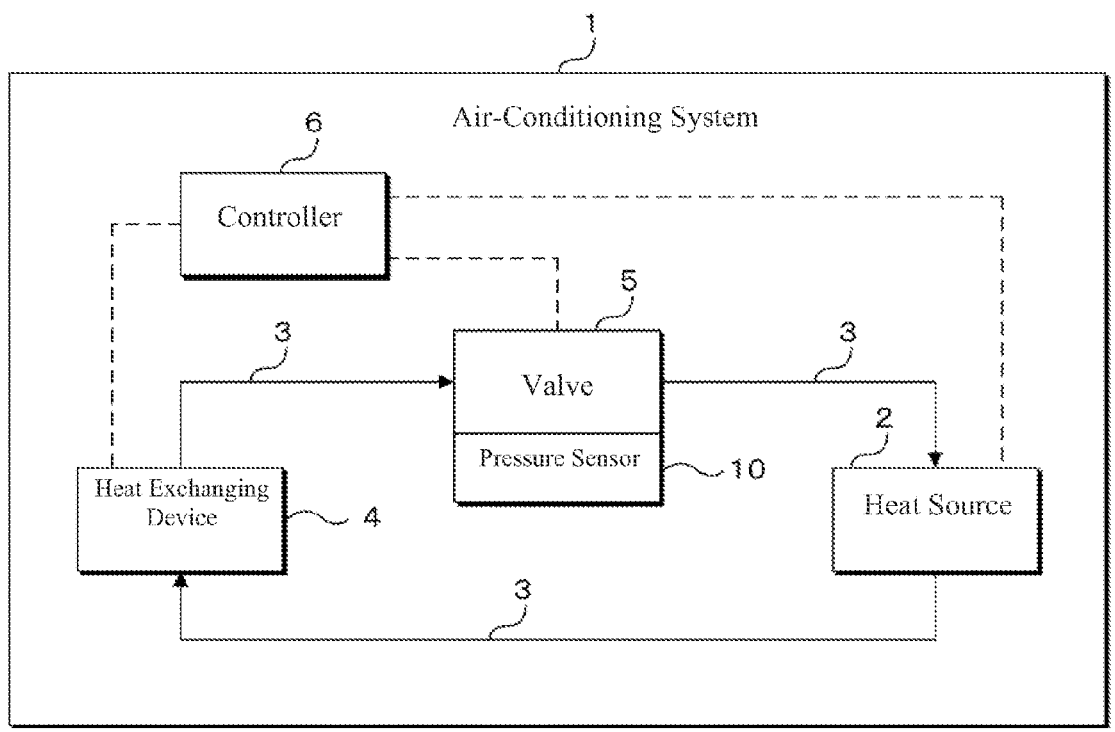
FIG. 1 is a block diagram illustrating a structure for an air-conditioning system in a form of embodiment.

The pressure sensor in the present example can be used, for example, as a sensor 10 for measuring a flow of cold water or hot water (a fluid) circulating within an air-conditioning system 1, illustrated in FIG. 1. In this case, the air-conditioning system 1 is provided with, for example, a heat source 2 for producing cold water or hot water, a pipe 3 for circulating the cold water or the hot water produced by the heat source 2, a heat exchanging device 4, provided on the pipe 3, a valve 5 for controlling the flow of the cold water or hot water that the pipe 3, and a controller 6 for controlling the system as a whole. The pressure sensor 10 is attached to the valve 5, and measures the rate of flow of the cold water or the hot water that flows in the pipe 3. When cooling, the air-conditioning system 1 circulates cold water, and when heating, the air-conditioning system 1 circulates hot water, to control the air-conditioning temperature.

A well-known semiconductor pressure sensor having a semiconductor substrate (silicon) wherein is formed a diaphragm (a thin pressure-sensitive portion) and a diffusion-type strain gauge formed through an impurity in a semiconductor substrate or through an ion implantation technology, for example, may be used as the pressure sensor 10. The diffusion-type strain gauge uses the piezo-resistive effect to detect a strain on the diaphragm due to the pressure being measured, to convert that strain into an electric signal. The pressure sensor 10 has a thermal characteristic wherein the gain and offset of the output vary depending on the use temperature.

Figure 2:
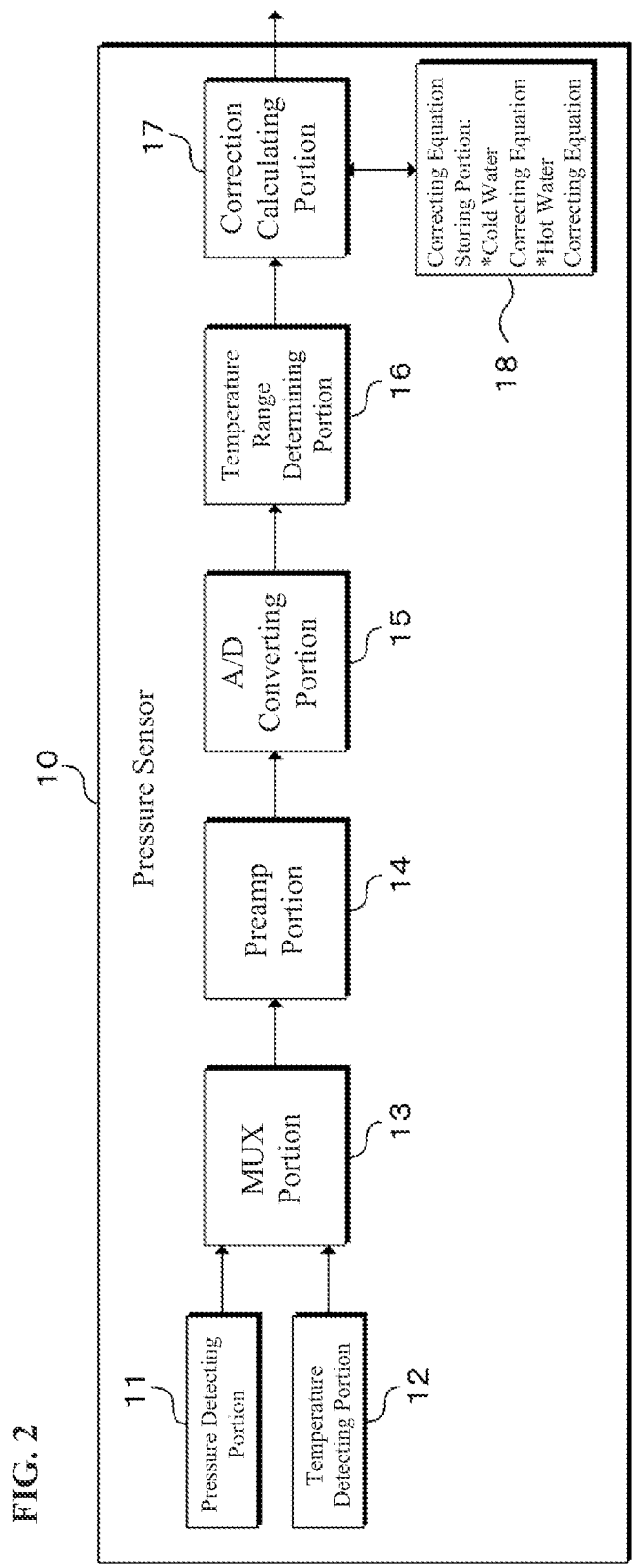
FIG. 2 is a block diagram illustrating a function structure for a pressure sensor in a form of embodiment.

The functional structure of the pressure sensor 10 is explained in reference to FIG. 2. As illustrated in FIG. 2, the pressure sensor 10 has a pressure detecting portion 11, a temperature detecting portion 12, an MUX portion 13, a preamp portion 14, an A/D converting portion 15, a temperature range determining portion 16, a correction calculating portion 17, and a correcting equation storing portion 18.

The pressure detecting portion 11 detects the pressure of the cold water or the hot water, and outputs the detection signal to the MUX portion 13. The temperature detecting portion 12 detects the temperature of the pressure sensor 10, and outputs the detected temperature to the MUX portion 13

The MUX portion 13 is, for example, a multiplexer, and receives the respective signals from the pressure detecting portion 11 and the temperature detecting portion 12, selects one of the signals, and outputs it to the preamp portion 14. The preamp portion 14 amplifies the signal that has been received from the MCA portion 13, and outputs it to an A/D converting portion 15. The A/D converting portion 15 converts the analog signal, received from the preamp portion 14, into a digital signal, and outputs it to the temperature range determining portion 16, The temperature range determining portion 16 determines whether the temperature detected by the temperature detecting portion 12 is in the cold water temperature range (for example, between 5° C. and 20° C., both here and below), or within the hot water temperature range (for example, between 40° C. and 60° C., both here and below).

The correction calculating portion 17 reads out, from the correcting equation storing portion 18, information pertaining to the correcting equation corresponding to the temperature range determined by the temperature range determining portion 16. The correction calculating portion 17 uses the information pertaining to the correcting equation, which has been read out, to correct the detection signal from the pressure detecting portion 11, to send the post-correction signal as a temperature signal to a controller.

The correcting equation storing portion 18 stores information pertaining to a correcting equation used in a correcting process to eliminate the portion of fluctuation due to the temperature variation, from the detection signal by the pressure detecting portion 11. As the correcting equation, there is, for example, a correcting equation for cold water that is applied when the temperature detected by the temperature detecting portion 12 is included in the cold water temperature range, and the correcting equation for hot water that is applied when the temperature detected by the temperature detecting portion 12 is included in the hot water temperature range. The cold water correcting equation and the hot water correcting equation are linear equations having temperature as the variable.

The cold water correcting equation may use, for example, a linear equation that minimizes the maximum difference between the output value corresponding to the detection signal by the pressure detecting portion 11 and the value corresponding to the measurement signal after correction, in the cold water temperature range. The hot water correcting equation may use, for example, a linear equation that minimizes the maximum difference between the output value corresponding to the detection signal by the pressure detecting portion 11 and the value corresponding to the measurement signal after correction, in the hot water temperature range.

The correcting equation storing portion 18 may store the cold water correcting equation and the hot water correcting equation separately, as-is, or may store a table that stores the factors required to determine the cold water correcting equation and the hot water correcting equation. As factors there are, for example, a gain factor and an offset factor. FIG. 3 illustrates an example of a table for storing factors. As illustrated in FIG. 3, the gain factor and the offset factor are stored in a table in a form wherein those for cold water are distinguishable from those for hot water.

In this case, the correction calculating portion 17 reads out, from the correcting equation storing portion 18 the gain factor and the offset factor corresponding to the temperature range determined by the temperature range determining portion 16, and uses a correcting equation into which the factors that have been read out are substituted, to correct the signal detected by the pressure detecting portion 11.

The correcting equation into which the factors have been substituted may be expressed as illustrated in Equation (1), below, for example:

$$Vout = f(Vin, T) \tag{1}$$

The Vout in Equation (1), above, is the measurement signal after temperature correction, and Vin is the detection signal prior to temperature correction, where T is the detected temperature. f(Vin, T) is a linear equation.

As described above, the pressure sensor according to the present example is able to perform temperature correction using an equation that corresponds to the cold water temperature range when the temperature detected by the temperature detecting portion 12 is in the cold water temperature range, and able to perform temperature correction using the correcting equation corresponding to the hot water temperature range when the temperature detected by the temperature detecting portion 12 is included in the hot water temperature range, which is distinct from the cold water temperature range, when performing temperature correction on the detection signal by the pressure detecting portion 11. Doing so makes it possible to perform pressure correction using a correcting equation that is optimized to the individual temperature range, by selecting two temperature ranges, which do not overlap each other, based on the use temperature range of the pressure sensor 10, thereby enabling an improvement in the accuracy of the temperature correction.

A linear correcting equation that minimizes the maximum difference between the output value corresponding to the detection signal by the pressure detecting portion 11 and the value corresponding to the measurement signal after correction may be used as the correcting equation for the cold water and as the correcting equation for the hot water, thus making it possible to reduce the amount of storage used for the correcting equations while controlling the difference to a maximum limit.

In particular, the pressure sensor 10 in the present example is used in an air-conditioning system 1, where the temperature of the water that is subject to measurement is limited to the 5° C. through 20° C. that is the temperature of the cold water and the 40° C. through 60° C. that is the temperature of the hot water, and thus the temperature ranges when performing temperature correction on the pressure sensor 10 can be limited to these two ranges that are not continuous with each other. That is, because, when performing the temperature correction, it is possible to prepare the correcting equations separately, limited to the two aforementioned temperature ranges, it is possible to prepare correcting equations with little error. Because of this, it is possible to improve the accuracy of the temperature corrections.

While the present invention was explained using the example set forth above, the description and drawings that form a portion of this disclosure do not limit the present invention. A variety of alternate examples and operating technologies should be obvious to those skilled in the art.

For example, while in the example set forth above the explanation was for a case of application of the present invention to a pressure sensor that has a temperature correcting function, the present invention may be applied similarly to a dual pressure sensor having two pressure sensors. In the case of a dual pressure sensor attached to a valve, two pressure sensors are disposed so as to measure, respectively, the fluid pressure on the upstream side of the valve and fluid pressure on the downstream side of the valve. Additionally, the correction calculating portion 17 corrects the respective detection signals and outputs, to a controller, the respective signals after correction as respective measurement signals. The controller calculates the differential pressure between the two pressure sensors through calculating the difference between the respective measurement signals, and uses the differential pressure to calculate a flow rate of the fluid.

Additionally, while in the example set forth above the temperature range determining portion 16 made a determination using the temperature detected by the temperature detecting portion 12, there is no limitation thereto when determining the temperature range. For example, instead calendar information may be referenced and the temperature range may be determined in accordance with season at that point in time, or a switch may be provided for switching the temperature ranges, and the temperature range may be determined in a forced manner by switching the switch.

Additionally, while in the example set forth above the correction calculating portion 17 calculated a temperature correction, there is no limitation to the correction by the correction calculating portion 17 being a temperature correction. For example, a pressure correction may be made in addition to the temperature correction. This is because the pressure sensor has, in addition to the aforementioned temperature characteristics, pressure characteristics wherein the output gain and offset will vary depending on the load (the pressure). In such a case, the information pertaining to the correcting equations used in the pressure correction may be stored in the correcting equation storing portion 18, where the correcting equations are used to perform pressure correction on the signal after temperature correction. Specifically, a gain factor and an offset factor for pressure correcting may be stored also in the table illustrated in FIG. 3. The correction calculating portion 17 reads out, from the correcting equation storing portion 18, the gain factor and the offset factor for use in pressure correction, corresponding to the temperature range determined by the temperature range determining portion 16, and uses a correcting equation into which the read-out factors have been substituted, to perform the pressure correction on the signal after temperature correction.

The correcting equation into which the factors for the pressure correction have been substituted can be expressed as in Equation (2), below:

$$Vout2 = (Vout) = g(f(Vin, T)) \tag{2}$$

The Vout2 in Equation (2), above, is the measurement signal after pressure correction, where Vout is the signal after temperature correction in Equation (1), above.

The invention claimed is:

1. A physical quantity sensor, comprising:
   a physical quantity detecting element that detects a physical quantity of an object to be measured;
   a temperature detecting element that detects a temperature of the physical quantity detecting element;
   a correcting equation storing portion that stores
      correcting equations including
         a first correcting equation and
         a second correcting equation, and
      two sets of information as information for the correcting equations used in a correction process to eliminate a portion of fluctuation due to temperature variation from a detection signal of the physical quantity detecting element, the two sets of information including, respectively,
         first information for the first correcting equation that is applied when the temperature of the physical quantity detecting element is included in a first temperature range, and second information for the second correcting equation that is applied when the temperature of the physical quantity detecting element is included in a second temperature range that does not overlap the first temperature range;
a temperature range determining portion that determines a first temperature range or a second temperature range as a temperature range wherein the temperature detected for the temperature detecting element is included; and
a correction calculating portion that uses the correcting equation corresponding to the temperature range determined by the temperature range determining portion to perform temperature correction to correct the detection signal by the physical quantity detecting element and outputs the post-correction signal as a measurement signal, wherein
the first correcting equation and the second correcting equation are linear equations that minimize the maximum difference between an output value corresponding to the detection signal of the physical quantity detecting element and a value corresponding to the measurement signal after correction, in the respective temperature range pertaining to that correcting equation, and
the correcting equation storing portion further stores
additional two sets of information as information for the correcting equations used in a correction process to perform pressure correction after the temperature correction, the additional two sets of information including, respectively,
third information that is used for performing the pressure correction after the temperature correction when the temperature of the physical quantity detecting element is included in the first temperature range, and
forth information that is used for performing the pressure correction after the temperature correction when the temperature of the physical quantity detecting element is included in a second temperature range that does not overlap the first temperature range.

* * * * *